(12) United States Patent
Galati

(10) Patent No.: US 7,570,194 B2
(45) Date of Patent: Aug. 4, 2009

(54) HIGH PRECISION SURVEILLANCE SYSTEM BY MEANS OF MULTILATERATION OF SECONDARY SURVEILLANCE RADAR (SSR) SIGNALS

(75) Inventor: Gaspare Galati, Rome (IT)

(73) Assignee: Università Degli Studi Di Roma "Tor Vergata", Rome (IT)

( * ) Notice: Subject to any disclaimer, the term of this patent is extended or adjusted under 35 U.S.C. 154(b) by 207 days.

(21) Appl. No.: 11/596,592

(22) PCT Filed: May 10, 2005

(86) PCT No.: PCT/IB2005/051519

§ 371 (c)(1),
(2), (4) Date: Feb. 9, 2007

(87) PCT Pub. No.: WO2005/111654

PCT Pub. Date: Nov. 24, 2005

(65) Prior Publication Data

US 2008/0231494 A1   Sep. 25, 2008

(30) Foreign Application Priority Data

May 17, 2004   (IT)  .............................. RM04A0249

(51) Int. Cl.
*G01S 13/93* (2006.01)
(52) U.S. Cl. .............................. 342/30; 342/32; 342/37
(58) Field of Classification Search .............. 342/29–40
See application file for complete search history.

(56) References Cited

U.S. PATENT DOCUMENTS

| | | | |
|---|---|---|---|
| 6,380,894 B1 | 4/2002 | Boyd et al. | |
| 6,819,282 B1 * | 11/2004 | Galati et al. | 342/37 |
| 7,187,327 B2 * | 3/2007 | Coluzzi et al. | 342/458 |
| 2004/0233095 A1 * | 11/2004 | Galati et al. | 342/37 |
| 2008/0231494 A1 * | 9/2008 | Galati | 342/37 |

FOREIGN PATENT DOCUMENTS

WO    98/05977    2/1998

OTHER PUBLICATIONS

International Search Report for PCT/IB2005/051519 dated Sep. 27, 2005.

* cited by examiner

*Primary Examiner*—John B Sotomayor
(74) *Attorney, Agent, or Firm*—Nixon & Vanderhye, PC (57) ABSTRACT

A system able to locate and identify aircraft and vehicles based on the reception and processing, with novel means and methods, of signals emitted by the transponder of the secondary surveillance radar, shortly SSR. The system has a number of fixed stations distributed in the area of interest, e.g. in the airport area; any signal (the well known SSR reply/squitter) transmitted by the on-board transponder is received by four or more stations and the measurement of three or more differences of times of arrival (TOA) permits the reconstruction of the position of the transponder in spite of the fact that the transmission time is unknown. Suitable algorithms based on optimal estimation enhance both the accuracy of TOA measurements and the accuracy of the reconstructed position. The effects of possible overlapping of signal in time are avoided or mitigated by multiple source separation techniques based on least squares algebraic processing.

9 Claims, 4 Drawing Sheets

HIGH PRECISION SURVEILLANCE SYSTEM BY MEANS OF MULTILATERATION OF SECONDARY SURVEILLANCE RADAR (SSR) SIGNALS

This application is the US national phase of international application PCT/IB2005/051519 filed 10 May 2005 which designated the U.S. and claims priority to IT RM2004A000249 filed 17 May 2004, the entire contents of each of which are hereby incorporated by reference.

FIELD OF THE INVENTION

This invention belongs to the field of the management of air traffic and of airport traffic, and of surveillance and identification of mobiles (aircraft, ground vehicles). In particular it is applied in cooperating surveillance using Secondary Surveillance Radar signals transmitted downlink by on-board transponders.

BACKGROUND AND SCOPE OF THE INVENTION

This invention is based on the reception and processing, with new means and methods, of signals emitted by an equipment present on board of all aircraft operating in the controlled airspace, i.e. the transponder of the secondary surveillance radar, SSR for short. The invention applies to both transponders with less recent characteristics (Mode A and C, not selective, with 12 bit indication of the target identity—Mode A—and of the barometric altitude—Mode C) and for transponders with more recent characteristics (selective Mode S or selective, with reply code of 112 or 56 bit), as well as for equivalent equipment (called "non-transponder devices") for vehicles even though not respecting air-worthiness requirements.

In such a context, the present invention refers to a system, internationally called Multilateration (MLAT) whose functional and operational requirements are contained in the following document written from the International Organization Eurocae—The European Organization for Civil Aviation Equipment:

[1] Eurocae ED-117 "Minimum operational performance specifications for Mode S multilateration systems for use in A-SMGCS", April 2003, available at Eurocae, 17, rue Hamelin, Paris Cedex 16.

An MLAT system has the scope of localization and identification, typically but not exclusively in the airport area, of the aircrafts and the vehicles equipped with an appropriate transponder, more exactly of above-mentioned transponder of the secondary surveillance radar (SSR).

The SSR radar system both of traditional type or "mode A/C" and of selective type or "mode S", is described in several documents among which the book:

[2] M. Stevens "Secondary surveillance radar", Artech House, 1988.

A system for control and management of airport traffic that can include Multilateration (MLAT) is internationally known with the acronym A-SMGCS (Advanced-Surface Movement Guidance and Control System). In such a system the present invention, from the applications point of view, is framed. A-SMGCS is described, among the others, in the document:

[3] Eurocae ED-87A "Minimum performance specifications for Advanced-Surface Movement Guidance and Control Systems", January 2001, available at the Eurocae, 17, rue Hamelin, Paris Cedex 16.

MLAT systems receive and process the replies emitted by SSR transponders, once interrogated, and/or the "spontaneous replies" emitted periodically in the absence of interrogations, and called "squitter". The processing of such signals, as described in [1] and [2], permits to localize the transponder, and therefore the aircraft or the vehicle carrying this, by means of the measurement of the times that elapse from the emission—by the transponder—of the reply/squitter signal (that thereafter will be called simply "SSR signal" or shortly "signal") and its reception by MLAT receiving stations (four or more). The measurement of at least three differences of the times of arrival (TDOA technique: Time Difference of Arrival also said Delta-TOA: Difference in Time of Arrival) permits to localize the transponder in the space through intersection of three hyperboloids. Such method has been applied already from the half of the twentieth century to other types of signals, the so-called hyperbolic navigation with classic algorithms described in several works among which:

[4] R. O. Schmidt "A new approach to geometry of range difference location", IEEE Transactions on Aerospace and Electronic Systems, Vol. AES-8 No. 6, November 1972, pp. 821-835.

Multilateration technique has been the object of many patents, (starting from the ancient U.S. Pat. No. 2,972,742 by Ross) among which:

[5] U.S. Pat. No. 3,659,085 of 25 Apr. 1972: "Computer determining the location of objects in a coordinate system", inventors: B. And Potter; T. K. Bosworth; J. P. Chisholm; J. A. Cadzow, in which methods are proposed in order to reduce the localization error, in a general context, that is specific neither of the application to SSR signals (A/C or Mode), nor to the use for airport surveillance, and

[6] European Patent Number: EP 0466239 of 15 Jan. 1992: "Device for identifying and localizing transponders", inventor Frans Herman De Haan (NL), in which the airport is divided in a considerable (100-250) number of regions each of them has at least one, better two, emitters and at least two receivers in order to localize SSR transponder by means of Multilateration, and in which emitters and receivers are connected to a central processing unit.

In today's market there are three different MLAT systems developed respectively by the Companies: ERA (Czech Republic), Sensys (USA) and Thales (Germany) and presented at the specialized International Exhibitions or Fairs, such as the Maastricht Exhibition on Air Traffic Management that is carried out in spring of every year. However, specific patents related to such MLAT systems have not been found. In a generic MLAT system, each station is equipped with a receiver for SSR signals that allows it to measure the time of arrival of each of them. Such measurement can be got, according to two possible and functionally equivalent realizations whose choice depends on the set of operations, as follows. The first solution includes local measurements, therefore executed at each measuring Station, equipped with a precise clock (locked to that one of a master station through radio connection or on cable), while in the second solution the measurements are executed at the central processing station; in this second realization SSR signals are simply transmitted in real time and transparent mode to the central processing, where the measurements of time are executed. The MLAT system developed by ERA uses the second solution, with transmission of the waveform of SSR signals from the receiving stations to the central processing computer, while other two systems (Sensys and Thales) are based, instead, on the second solution and have measuring stations not only receiving but also with processing capacity. All of three systems can be considered "first generation" systems, while the System, equipped with digital transmission and object of the present invention, is a system of second generation for its advanced characteristics well described later.

SUMMARY OF THE INVENTION

It is a specific object of this invention a System for locating and identifying aircraft and other vehicles on the basis of reception—by multiple Stations—of SSR signals transmitted by the standard SSR transponder on board; compared with the first generation systems described in the last part of previous section Background and Scope, this System is characterized, from the functional point of view, by: (a) optimized TOA measurements, (b) estimation of the clock drift of the receiving stations, making possible to implement low cost stations, (c) usage of linear algebra algorithms based on least squares solutions to separate superimposed signals, i.e. signals that overlap in time, (d) compound usage of non-recursive and recursive algorithms in the central processor to implement Multilateration.

The basic operation principle for the System object of the present invention is the following: from a certain number of measuring and receiving Stations, about ten/twenty, (in the following they are simply called Stations) "reply" or "squitter" signals of SSR transponders, whose operation is illustrated in [2], are received. The above-mentioned signals are called "SSR signals" or simply "signals" thereafter. The Stations are equipped with a detection logics of the signal arrival and with an embedded clock to which measurement of detection time is referred, called Time of Arrival (TOA). Such measurement is sent to a central processing unit together with other data that characterize the signal. Various methods for the transmission to the central processing unit exist, well known to the experts of the field, among which those based on data-transmission networks of well established technology and widely available. Once suppressed the unavoidable shifts between the clocks of the various Stations, the time measurements are proportional—through the speed of the light—to the distances between the transponder and the Stations. The shift of the clocks is an important problem: a shift of just three nanoseconds involves an error of ninety centimeters. An estimation of the position of the vehicle from four measurements related to—at least—three time differences of measures (TDOA—Time Difference of Arrival, very famous in the technical literature, for example, in [4]) allows to localize the transponder even if the time instant of emission of the signal by the transponder is unknown. The location algorithms, well-known in literature, too, calculate the solution of a system of non linear equations; among the possible methods, the recursive ones, based on least squares, are the most precise. The solution suffers from a "geometric dilution of precision" known as DOP in the literature, that renders the location less precise than the single measurements in dependency of the geometry, that is of the relative position of the transponder and the stations. This fact is quantified by the numerical factor DOP that multiplied for the error of the single measurements gives the error of location of the transponder and therefore of the vehicle. DOP values can be, in some operating areas, rather high, involving, therefore, an imprecise measurement of insufficient operational usefullness.

The limitations of the state of the art in the context of the present invention can be referable to the limited precision of the measurements that allow localization of the transponder and therefore of the vehicle that carries it on board. In fact in the existing MLAT systems the measurements of the time of arrival of SSR signals in each Station are obtained getting the instant of time correspondent to the overcoming of an assigned threshold of amplitude by the leading edge (or trailing edge) of the first pulse of the signal, with a quantization error due to the fact that such time is found by reading, in correspondence to this event, a clock with which the Station is equipped; this procedure involves, for the measurement, a quantization step equal to the period of the clock (for example 33 nanoseconds—corresponding to 10 meters—for clock at frequency of 30 MHz) with a correspondent peak to peak error of the same entity.

Another problem of existing MLAT systems is the synchronization between the clocks of the various Stations and the temporal reference of the central processing unit where the multilateration algorithm is implemented. In the absence of the synchronization it would not be possible to reconstruct the position of the transponder because the measurements of the various Stations that contribute to location of the transponder would be affected with deviations (i.e. bias) that in turn would affect in an uncontrollable way the location itself, as is known to the experts of the field. In the existing state of the art, synchronization is often realized controlling the clock of the Stations with atomic clocks or using the precise time supplied by GPS receivers. Both these solutions have some drawbacks, in fact the atomic clocks are well more expensive than the quartz clocks and the use of the GPS renders the system vulnerable to eventual electromagnetic disturbances in the range of frequency of GPS and to eventual interruptions or intentional degradations of the GPS service by the manager of the GPS system.

Moreover, existing Multilateration systems are not capable to discriminate superimposed SSR signals; in the case of superimposition, the measurement of the time of arrival is often limited to the first arrived signal and the decoding is incomplete or missing as superimposition corrupts the codes; therefore, the location and identification function is severely affected. This is an increasingly important problem as the future wider and wider use of Multilateration and other SSR-based systems will render the superimposition condition more and more probable.

Finally, a critical aspect of existing MLAT systems is the Multilateration algorithm: iterative algorithms (recursive) introduce problems of initialization and convergence, not-iterative algorithms can offer an insufficient precision.

The present invention exceeds, with original technical and architectural solutions, the limitations of MLAT systems pre-existing the invention itself and allows to considerably improve the operation both in terms of performance and in terms of reliability and continuity of the service.

In particular the limitations of the state of the art previous to the present invention are exceeded through: (a) a new measurement technique for the TOA (time of arrival) that allows to obtain much greater precision than the existing state of the art and is not limited from the frequency of the clocks of the measurement Stations, (b) the use, in each Station, of a simple clock, at low cost and free to deviate from the temporal reference of the central processing unit, in which the temporal data of the Station is estimated, with an original procedure, without the necessity of synchronizing it and without neither expensive (and complex) atomic clocks neither GPS receivers, one of which can however be used in the present invention in order to report the events to the "GPS Time" without introducing any critical consequence to safety and continuity of the service, (c) a new technique, based on multiple sources separation by means of algebraic signal processing, to discriminate superimposed SSR signals, and (d) the use on both non-recursive and recursive algorithms for the Multilateration function.

The basic concept of the new measurement technique, (a), is the optimal estimation of the time of arrival of signals through a filter matched to the signal itself followed by a differentiator, and finally followed by an interpolation processor that allows to obtain a measure TOA with resolution that does not depend on the granularity of the clock. Such concept is based on the theory of maximum likelihood estimation, for which the interested reader is addressed to:

[7] G. Galati, F. A. Studer: "Maximum likelihood azimuth estimation applied to SSR/IFF systems", IEEE Transactions on Aerospace and Electronic Systems, Vol. 26, N. 1, January 1990, pp. 27-43.

The basic concept that permits the use of simple clocks, previous point (b), is to reconstruct the precise and common temporal reference of the events of each Station through filtering and prediction, according to the classic Kalman methodology, of TOA measures made by the Station itself on signals coming from transponders of rigorously known positions, the so-called reference transponders, and such that each Station is in visibility of, at least, one of them. In such a way the main part of the shifts of the clocks is estimated and compensated, allowing the use of simple, reliable and cheap technologies for the clock, that moreover are left to evolve without necessity of synchronization processes. The Kalman filtering is described in many text books among which:

[8] K. V. Ramachandra "Kalman filtering techniques for radar tracking", M. Dekker, Inc. (New York), 2000.

The preferred realization of multiple sources separation, previous point (c), is based on the use of multiple (at least, three) receiving channels, i.e. on a linear array architecture. In the case of superimposed signals arriving from different directions, the output of each channel is a linear mixing of the different signals, i.e. the result of multiplication of signals by a mixing matrix (generally, not known a priori). Therefore, different sources that can be unmixed by applying linear operators, or beam formers, depending on a real time estimation of the mixing matrix. The beam forming coefficients are obtained by the estimate of the covariance matrix of received data or equivalently, with simpler computation, by Singular Value Decomposition (SVD) of the data matrix whose rows are the received samples for each receiving channel. In the time intervals in which there is only one signal, and therefore one singular value of the matrix dominates, the related data submatrix in the absence of noise has unit rank, therefore its singular vector corresponding to the dominating singular value is an estimate of the submatrix. When this procedure is repeated for another submatrix related to the presence of the second signal alone, a second singular vector is estimated and the estimate of the whole mixing matrix is obtained. The beam formers are obtained by orthogonal projection of the singular vectors or equivalently by taking the pseudo-inverse of the estimated mixing matrix. When a signal is completely superimposed to another and therefore there is lack of insulated samples from it, it is necessary to estimate the beam former for the other signal and, by orthogonal projection, suppress it before estimating the beam former for the first signal.

The basic concepts of linear estimation, SVD and array processing are in many text books including:

C. Lawson, R. Hanson "Solving Least Square Problems" Prentice Hall Inc, Englewood Cliffs, N.J., USA, 1974.

S. Haykin "Radar Array Processing for Angle of Arrival Estimation", Chapter 4 of: S. Haykin, Editor "Array Signal Processing", Prentice Hall Inc, Englewood Cliffs, N.J., USA, 1985.

The use on both non-recursive and recursive algorithms for the Multilateration function, previous point (d), is useful as the non-linearity of the localization equations requires iterative procedures for the search of the optimal solutions. It is therefore important to choose algorithms able to guarantee the convergence, beyond the precision, and whose computational load is not excessive. In the preferred realization of the present invention, two algorithms in sequence are used. The first algorithm, non-recursive, initialises the estimation of the position while the second, recursive and based on the minimization of the quadratic error, improves the estimation until the required level of precision is reached.

The purpose of the present invention is to supply an advanced, second generation Multilateration system for locating and identifying cooperating mobiles, and a new method of location that allows the surveillance and the identification of aircraft and vehicles equipped with a standard SSR transponder or an equivalent device, in particular (but not exclusively) when these operate in the airport area and nearby it. Such a System is to traffic control avoiding, in particular, possible collisions. Thanks to this System, object of the present invention, the most stringent requirements of accuracy, continuity of service and integrity, are widely satisfied, with a remarkable increase of efficiency while maintaining, or increasing, the present levels of safety of the air transport also in adverse meteorological conditions and/or in case of high traffic.

The present invention is thereafter described in reference to its currently preferred forms of embodiment, reported for illustrative and not limitative purposes.

DETAILED DESCRIPTION

Figure 1:
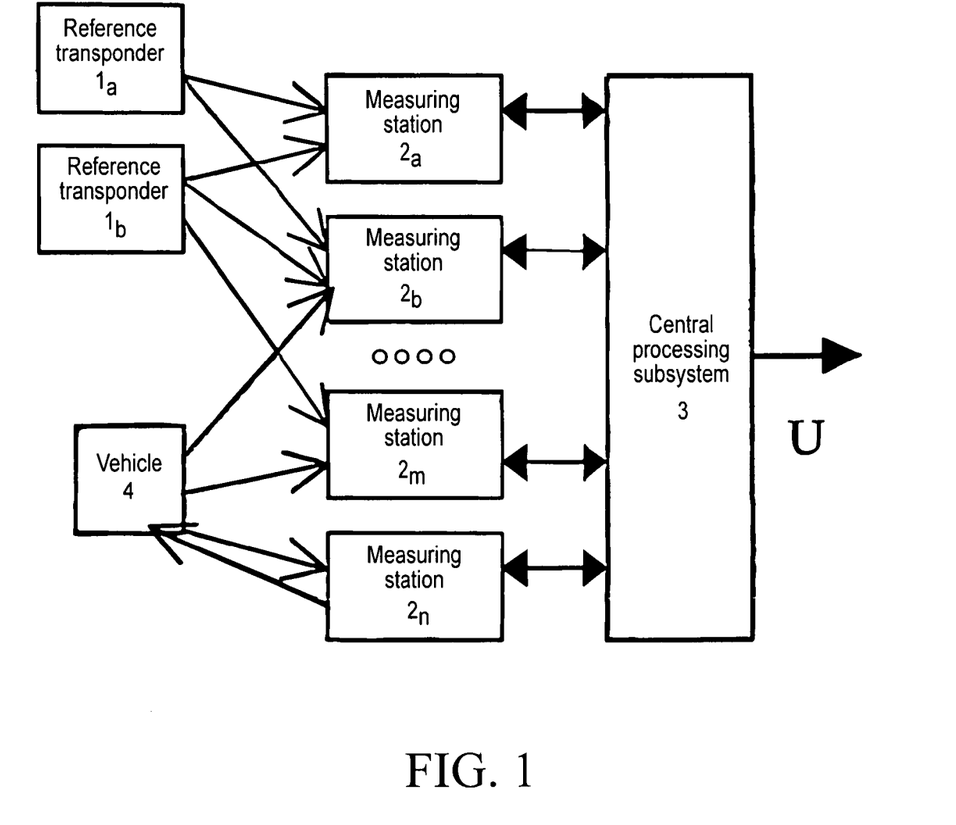
FIG. 1: general layout of the high precision surveillance System, object of the present invention; it is a general schematic diagram of the overall embodiment of the invention and its surrounding environment.

This invention describes a System composed by various elements—as shown in FIG. 1—operating with reference to the techniques and principles above described:

One or more reference Transponders able to emit standard SSR signals, according to a technique well-known in the field of air traffic control and airport surveillance, (see References [1] and [2]). These reference transponders are indicated with $1_a$ and $1_b$ and their typical number is two both for redundancy reasons, and for the necessity of having in optical visibility all the measuring Stations, that can be as many as fifteen. The reference Transponders are obtainable from the avionic ones in a simple way well-known to the experts.

A certain number (greater than three and of the order about ten or twenty, according to the dimensions of the airport and its configuration) of measuring Stations, indicated with $2_a$, $2_b$ ... $2_n$ in FIG. 1. Each Station receives both SSR signals emitted by the standard transponders on board the aircrafts and the equivalent devices on board the vehicles that are in the airport area, one of which is shown in FIG. 1 and is indicated as block 4, and SSR signals emitted by the reference Transponders. Each station computes the Time of Arrival (TOA) and decodes the block of data from the received SSR signals, obtaining the identity of the mobile and other relevant data according to the standards.

A central processing subsystem, or simply a central processor, indicated as block 3 in FIG. 1 where TOA, identity and other data are received from the Stations and are processed in order to perform location by Multilateration, i.e. to compute the position, and associate it with the identity of the mobile, to be sent to the surveillance system.

Figure 2:
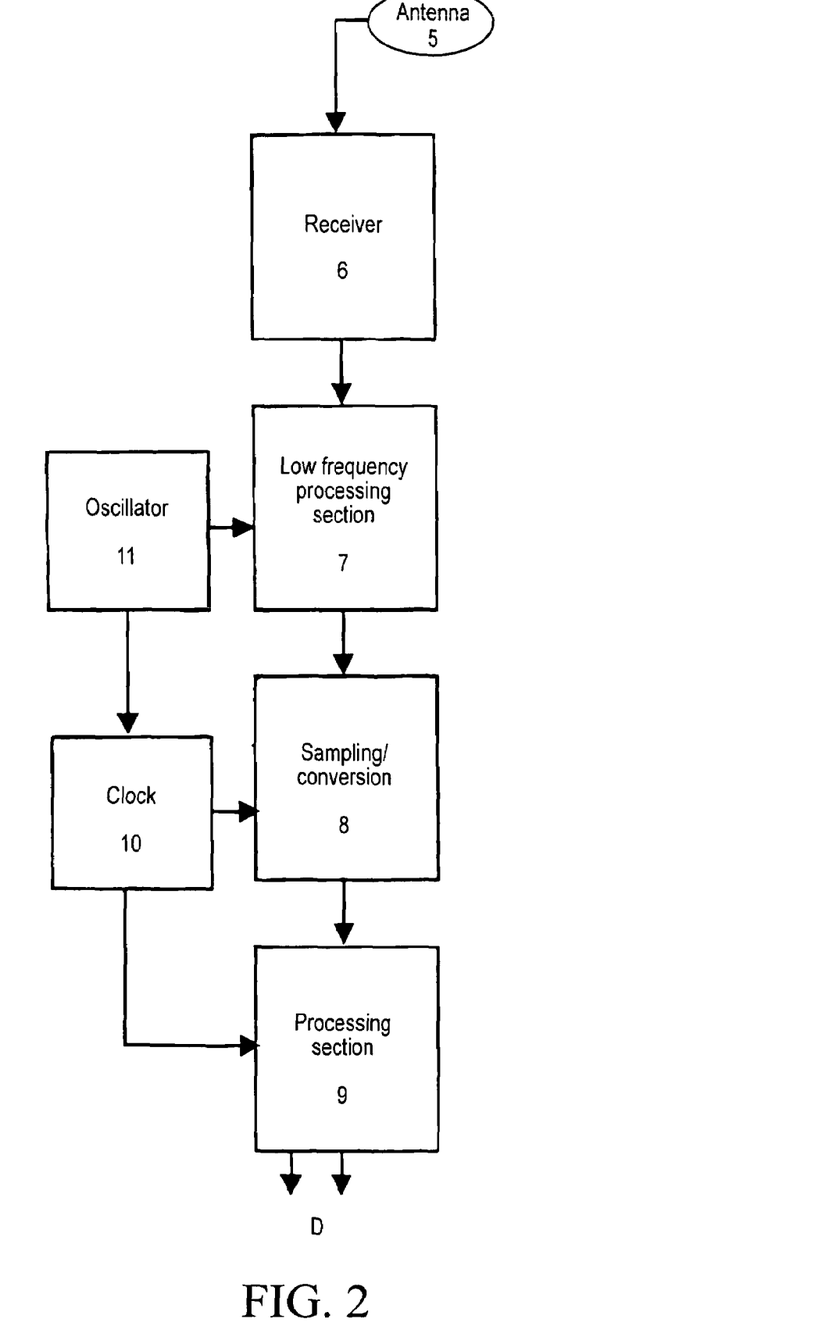
FIG. 2: layout of a Station whose complex constitutes a part of the present invention; it is a schematic diagram of one of the receiving Stations according to the invention.

Each station is made up of the blocks shown in FIG. 2: first of all the antenna, (block 5 in FIG. 2), which, in dependency of the installation, can be omni directional (that is, able to receive on 360° in azimuth) or able to cover a field of smaller azimuthal extension for example of 90° or multiple of 90°, realized according to well-known techniques. Moreover the station, see FIG. 2, contains a receiver for SSR signals, realized, in its radio frequency part (that constitutes block 6 in FIG. 2), according to well-known techniques and characterized by a high dynamic Range to process both signals emitted by transponder relatively near to the antenna (e.g. a few tens on meters) and signals emitted relatively far from it (e.g. one or a few tens of kilometers). The following analogue low-frequency section (block 7 in FIG. 2), includes the low-frequency conversion and filtering, performed by well known methods. The receiver can have either a linear or a logarithmic characteristic; the latter solution allows us to reduce the number of bits in the following analog/digital conversion but distorts somewhat the waveforms that will be processed in the digital section; the former, using coherent reception techniques well-known in radar and radio technology, permits to receive both real and imaginary components, i.e. I and Q, as needed for super resolution and array signal processing techniques, therefore it is preferred. From the analogue section of the receiver the signal is sent to the section of envelope detection and analogue/digital conversion, (block 8 in FIG. 2). In this block the signal is sampled at high rate and with high dynamic range and converted in digital form for the successive digital processing. The high dynamic range and the wide band of all the receivers are one important characteristic of the present invention because they allow to obtain a precision of the measurement of the time of arrival (TOA) well superior to the state of the art previous to the present invention.

Figure 4:
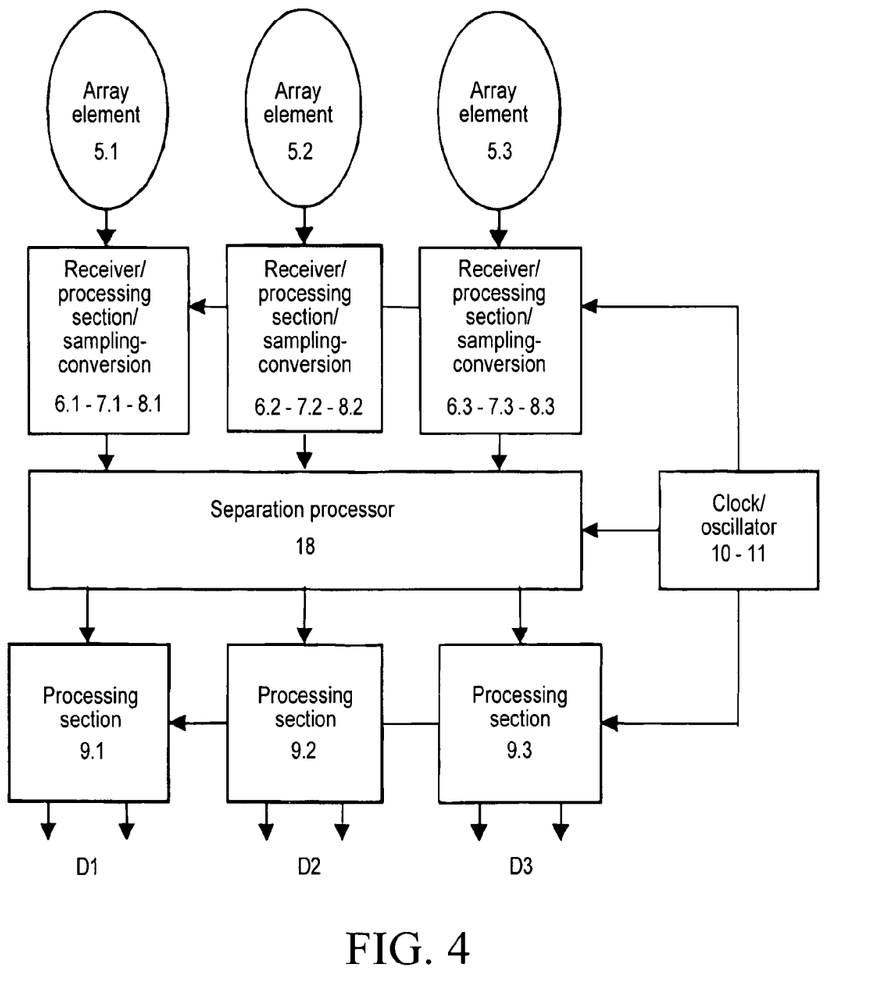
FIG. 4: layout of a preferred embodiment of the Station for applications with high chances of superimposition of signals; it is a schematic diagram of one of the receiving Stations in the embodiment with many (three in the drawing) receiving channels, according to the invention.

A particular implementation of the receiving Station part of present invention, as shown in FIG. 4, is needed in operational environments where the number of SSR signals present per unit time is high. In such implementation the receiving station has an antenna made up by a three-elements array, the number three being not limitative of the scope of the invention but only a preferred value when the expected number of superimposed signals is two; more generally, the number of array elements is greater than the maximum expected number of superimposed signals. Downstream each array element (blocks 5.1, 5.2 and 5.3), there is a complete receiving chain, i.e. the series of blocks 6.1, 6.2, 6.3; 7.1, 7.2, 7.3, and 8.1, 8.2, 8.3.

Figure 3:
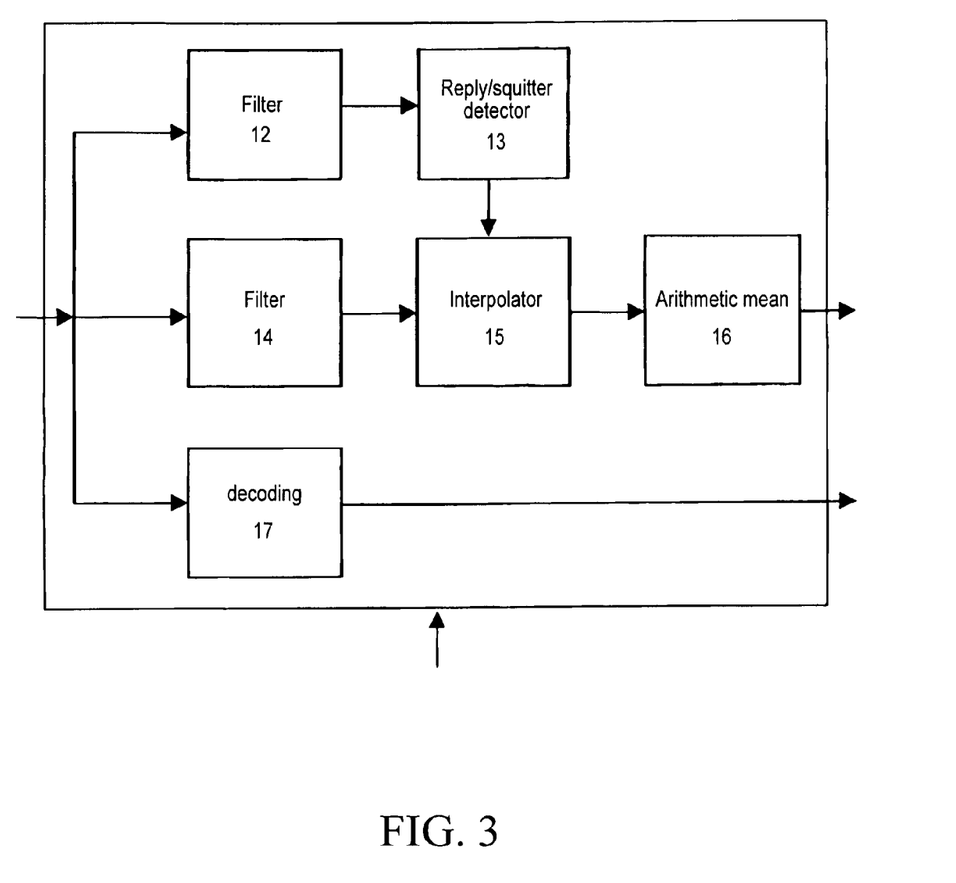
FIG. 3: layout of the digital processing part of a Station, part of the present invention; it is a schematic diagram of a part, namely the digital processing one, of a receiving Station according to the invention.

From the sampling and conversion section the digital signal is sent to the processing section, block 9 in FIG. 2, whose detailed structure is shown in FIG. 3. The processing section, realized with techniques well-known to the experts, includes various blocks that allow to detect the signal, both for SSR Mode A/C (that constitutes the old standard) and for Mode S (that, as well known, constitutes the more recent standard), to measure the time of arrival of the signal and to decode the messages contained in it. In the implementation (as explained before, suited for operational environments where the number SSR signals present per unit time is high) with the antenna made up by a three-elements array (or, in possible implementations, by more than three elements), the digital output of each receiving chain related to each array element be sent to a separation block whose operation is based on the Singular Value Decomposition of the data matrix whose rows are the received samples for each receiving channel. The time intervals in which there is only one signal are detected by comparing the Singular Values, whose number is equal to that of antenna elements, to a noise threshold; the definition of such a threshold is well known in the radar processing field. In the time intervals where only one singular value of the matrix exceeds the threshold, the singular vector corresponding to the dominating singular value is an estimate of the rank-one submatrix corresponding to the single source, i.e. to one signal arriving from a given direction. When this procedure is repeated for another submatrix related to the presence of the second signal alone, a second singular vector is estimated and the estimate of the whole mixing matrix is obtained. The beam formers are—preferably—obtained by taking the pseudo-inverse of the estimated mixing matrix, whose multiplication with the data matrix supplies an estimate of the signals present. When a signal is completely superimposed by another and therefore there is lack of insulated samples from it, it is necessary to estimate the beam former for the other signal and, by orthogonal projection, suppress it before estimating the beam former for the first signal.

Once detected by standard thresholding techniques, the signal is identified in its characteristic pulses (the pair of initial and final pulses, or brackets, for Mode A/C signals and the structured group of four initial pulses, or preamble, for Mode S). The successive measurement of the time of arrival of each pulse of the signal is obtained with an original method, meaningful element of the present invention and described in the following. For such a measurement a high stability clock is necessary, whose preferred realization is—among those of limited cost and highly stable—the one using a quartz crystal "Oven controlled crystal oscillator", OCXO. The oscillation generated by the quartz is also used, in the preferred realization of the present invention, in order to drive the reference oscillators necessary for the frequency conversion of the received signal. In FIG. 2 the set of data that the measuring Station supplies in output in correspondence to the detection of the SSR signal is finally indicated with D. The stations are connected—using networking according to the well-known methodologies of digital transmission—to a central processing Subsystem, block 3 of FIG. 1.

The central processing Subsystem (block 3 in FIG. 1) constitutes the element of the System, i.e. of the present invention, in which the several information are centralized; the position and the identity of aircrafts and vehicles equipped with an SSR transponder in the airport area or nearby are reconstructed from detection and TOA data supplied by each measuring Station and indicated with D in FIG. 2, or D1, D2, D3 in FIG. 4. Such set of data, indicated with U in FIG. 1, is sent to the airport surveillance system to be combined with other data, among which those of the primary radar, in order to construct the most complete representation of traffic.

Data transmission within the System object of the invention is permitted by a communication subsystem (Local Area Network) that connects, with techniques well-known to experts, the measuring Stations and the reference transponders with the central processing Subsystem.

The operation of the invention will be now explained with reference to its currently preferred forms of realization, reported according to the figures of the attached drawings.

FIG. 1 is the general layout of the invention. In it, block 4 indicates one of numerous SSR transponders present in the airport or in its vicinities, on-board the aircrafts or service vehicles. Of course, the on-board SSR transponders are standard equipment not belonging to the present invention: they are shown in block 4 of FIG. 1 for the sake of clarity. Each transponder emits—either spontaneously (on the average, once per second) or, owing to the interrogations by one or more SSR stations, in a reply mode—standard signals—on carrier frequency about 1090 MHz—called "squitter" or "reply" respectively; the measurement Stations, indicated with $2_a, 2_b \ldots 2_n$ in FIG. 1, receive, if the transponder is in the line of sight, the signal emitted by the transponder, measure the time of arrival in reference to their own internal temporal reference obtained, for each station, from the clock indicated with 10 in FIG. 2; the time of arrival obtained with the code contained in the signal is sent via transmission network to the central processing Subsystem, block 3 of FIG. 1, where if at least four measuring stations have received the same signal, a Multilateration algorithm, based on the concept of the hyperbolic navigation and on the theory of optimal estimation, computes the position of the antenna with that emitted the signal of the transponder, and therefore the position of the aircraft or vehicle, in three dimensions. One or more (preferably, two) reference Transponders, block $1_a$ and $1_b$ of FIG. 1, placed in known positions, allow to calibrate the measuring system of the position of the transponder on board of aircraft or vehicles, as explained in detail below.

FIG. 2 shows a measurement Station in which "squitter" or "reply" signals are received by an antenna—block 5—(preferably an omni directional one, but that according to the particular installation can have in the horizontal plane a coverage limited to a field of 180° or 90° or other values, in order to reduce the multipath effects), from which the signal, via coaxial cable, is sent to the radio frequency receiver—block 6—that is a high dynamic range and wide band receiver—in which are carried out: the limitation of dynamic range in order to avoid the damaging of the receiver itself, the filtering of unwanted signal out of the band of interest, and finally the amplification and the down conversion according to techniques and methods well-known to the experts. From block 6 the signal is sent to block 7, that includes the analogue, low-frequency processing of the signal, obtained with techniques and methods well known, too. Finally, the signal is sent to block 8 that represents the part of the receiver in which the signal is sampled at high sampling frequency, much greater than its bandwidth, and converted in digital form. For the block realization two possibilities exist. The first, the preferred one, consists, first of all, in a video conversion of the signal by means of coherent detection, that is with generation of in phase (I) and quadrature (Q) components of the complex according to a very popular and widely used technique described, inter alia, in paragraph 3, 1, 2 of:

[9] G. Galati, "Radar e Navigazione"—Texmat (Rome), 2004, then converted, in its I and Q components, in digital form by means of fast converters at high number of bits, today commercially available, with successive extraction of the modulus (also said envelope) through square root of the sum of the squares of I and Q; the second solution, simpler but less flexible, consists of a logarithmic detection of the envelope followed by the analogue to digital conversion; the first solution is preferred—in the present invention—for flexibility and compatibility reasons with the function of separation of the overlapping of SSR signals. With the preferred realization of the block of conversion in base band it is possible, adding computation resources in the signal processing part, i.e. in block 9, to implement the super-resolution algorithm that allows to discriminate overlapped SSR signals ("squitter "or" reply") and that is described in the following patent:

[10] University of Rome Tor Vergata "Super-Resolution Processor/Receiver to discriminate superimposed Secondary Surveillance Radar Replies and Squitter", U.S. Pat. No. 6,819,282 B1, Date: Nov. 16, 2004, Italian application n. RM2001A000176, dated Mar. 4, 2001, inventors: G. Galati and M. Leonardi.

As it is well known to the experts of the field, the received signal format can be SSR Mode A/C or, more and more often in the future, SSR Mode S.

From block 8 the signal, by now in digital form, is sent to the processing section, block 9 of FIG. 2, that receives in input—from block 10—also the clock necessary to its operation; the clock is obtained from an oscillator, whose preferred realization is among the quartz clocks having limited cost and high stability. The oscillator is block 11 of FIG. 2. The oscillation generated by quartz is also used, in the preferred realization of the present invention, to drive the reference oscillators, necessary for the frequency conversion of the received signal, and therefore sent as an input to block 7, block 10 and, through block 10, to block 8.

As explained before, there are operational environments where the number SSR signals present per unit time is high and the chance of overlapping of SSR signals is high; the implementation with the antenna made up by a three-elements array and an equal number of receiving channels (or by more than three elements and channels) in preferred in this case; this is a meaningful element of the invention and is called multichannel thereafter. In such a case the former solution that is with generation of in phase (I) and quadrature (Q) components of the complex envelope is needed and three or more receiving channels are used, as shown in FIG. 4. The realization and operation of the array elements 5.1, 5.2 and 5.3, of the radio frequency receivers 6.1, 6.2 and 6.3, of the analogue, low-frequency processors of the signal 7.1, 7.2 and 7.3, of the sampling and digital conversion blocks 8.1, 8.2 and 8.3 and of the processing section, blocks 9.1,9.2 and 9.3 are the same as the blocks 5,6,7,8 and 9 of the single channel architecture of FIG. 2, respectively. Also the oscillator, block 11 (whose output is sent to blocks 7.1, 7.2, 7.3 and 10), and the clock, block 10 (whose output is sent to blocks 8.1, 8.2, 8.3 and 9.1, 9.2, 9.3) are the same. The digital output of each receiving chain related to each array element is sent to a separation processor, block 18 of FIG. 4, whose operation is the inverse of the mixing of the superimposed replies and in the preferred embodiment is based on the Singular Value Decomposition of the data matrix whose columns are the digital samples for each receiving channel, i.e. the outputs of blocks 8.1, 8.2 and 8.3 in the three-channels case. A suited algorithm running in the separation processor, well known to the experts of statistical signal processing and of least squares problems, performs the Singular Value Decomposition (SVD) of the data matrix, i.e. of the matrix whose rows are the received samples for each receiving channel, supplying as an output the singular values and the related singular vectors of the matrix. By comparison with a noise threshold, i.e. by a method well known in radar processing and in detection theory, the leading time interval in which one singular value exceeds the threshold, i.e. dominates, is found. It is assumed that in this interval there is only one signal, and therefore the related data submatrix in the absence of noise has unit rank. Hence, the singular vector corresponding to the dominating singular value is taken from the output of SVD processing an estimate of the submatrix. This procedure is repeated for the submatrix related to the presence of the second signal alone, i.e. in the trailing time interval where there is one dominating singular vector; this interval is found, again, using a noise threshold. Assuming that two signals are superimposed, the data matrix has rank two (neglecting noise) and the estimate of the whole mixing matrix is directly obtained from the singular vectors corresponding to two singular vectors as computed in the leading and trailing intervals. The beam formers that separate the superimposed signals are obtained, in the preferred embodiment, by taking the pseudo-inverse of the estimated mixing matrix. When a signal—that is called "trailing signal" in the following—is completely superimposed by another (the "leading" one) and therefore there is lack of insulated samples from it, it is necessary to estimate the beam former for the leading signal superimposed to it. To do that, the presence of an interference-free part of the leading signal is assumed; the estimation of the mixing matrix for this rank—one portion of the data matrix is done as explained before and, by orthogonal projection, the leading signal is suppressed before estimating the beam former for the trailing signal.

The separated signals (plus noise) are the outputs D1 and D2 of block 18.

In both cases, i.e. either a single channel embodiment as shown in FIG. 2 or a multiple channel embodiment as shown in FIG. 4, the processing section, realizable with techniques well-known to the experts, includes several blocks that allow to detect the pulses making up the SSR signal, to determine the signal time of arrival with high precision and—in case of Mode S—to decode the sequence of pulses that constitutes the data block. For the detection and, even more, for the measurement a high stability clock is necessary, block 10 of FIG. 2, that is also used to drive all the digital parts of the receiver (block 9 of FIG. 2) and the analogue to digital conversion.

The processing for detection, measurement and decoding is executed in the signal processing section, block 9, that is described in detail in FIG. 3 that refers to the section related to the processing of Mode S signals. The section related to the traditional A/C Mode SSR replies has the same layout and works in equivalent mode, therefore it is not shown. The timing of the several blocks of FIG. 3 is controlled through the clock of the Station, generated from block 10 of FIG. 2, and the clock signal is indicated with C in FIG. 3. Block 12 of FIG. 3 is the filter matched to the Mode S signal. The concept and the realizations of such an matched filter are illustrated in several text-books among which the (above-mentioned) reference [9]. Since the receiving chain upstream the matched filter has a much greater bandwidth than the signal one, the pulses that constitute the signal have a form very similar to that of the transmitted pulses, that is the trapezoidal form of dimensions established by the international standards. Therefore the matched filter to the single pulse is a simple digital filter with finite impulse response (shortly: FIR filter) with an approximately trapezoidal form, and a part of its coefficients—precisely the central one—is approximately constant. The filter matched to the whole preamble (i.e. a sequence of four pulses characterizing every Mode S signal) recognizes the sequence of pulses that made up the Mode S preamble with well known methods, the preferred here being an operation of convolution as described, among the others, in reference [9]. The matched filter output is sent to the reply/squitter detection part, block 13, in which the detection of the presence of signal is carried out through comparison of the signal with a noise threshold; once detected, the measurement of the time of arrival of each pulse of the signal is enabled, through the signal indicated with A. The aforesaid measurement is obtained with an original method, meaningful element of the present invention: on each pulse of the signal that, beyond the block 12, is also sent to block 14 of FIG. 3, it is performed, inside block 14, a filtering correspondent to the single-pulse matched filter, previously described, followed by a differentiator (i.e. the computation of the first derivative). The filter resulting from the cascade (i.e. the series) of the single-pulse matched filter and the differentiator is a simple FIR filter. Its coefficients can be divided in three groups. A smaller number of consecutive coefficients, corresponding to the positive peak of the derivative, has similar values, that can be set all equal to the unit without significantly affecting the quality of the measurement. A greater number of consecutive coefficients has values very close to zero: as before, they can be all set equal to zero. Finally a third number of consecutive and coefficients corresponding to the negative peak of the derivative have approximately equal values and can be set all equal to minus one (i.e. −1). The number of positive coefficients is equal to the ratio between the rise-time and the sampling interval, and the number of negative coefficients is equal to the ratio between the fall-time and the sampling interval. The output of block 14 will be therefore a value that changes from positive to negative (or vice versa) in correspondence of the maximum of the received pulse. Since the signal is sampled, a positive value in correspondence to a certain step of the system clock has to exist, followed by a negative sample (or vice versa), that is, a change of sign (also called "zero crossing") has to occur at the output of block 14. In the present invention a time accuracy better than the sampling interval is achieved: beyond the use of the "matched filter—differentiator" filtering above described, a new technique is used that permits to obtain the estimation of the zero-crossing time even if it does not happen in correspondence to any step of the clock. Such a result is obtained in block 15 of FIG. 3, that accepts at its input the values of the last positive amplitude (or negative respectively) with associated the ordering number of the correspondent temporal sample, that is the value of the relevant discrete time, and the successive negative amplitude (or positive respectively), with the associated ordering number of the correspondent temporal sample, that is the value of the relevant discrete time. In block 15—if the enabling signal A is present, indicating detection of a pulse—a linear interpolation is carried out, that is to determinate the straight line that joins, in the amplitude-time plane, the two above-mentioned points and its point of intersection with the axis of the abscissas, i.e. of times, is found. This interpolated time value is the best estimate of the time of arrival (TOA) for the single pulse of the SSR signal, whose precision and resolution are not limited by the duration of the clock step but only by the number of bits with which we decide to represent and to calculate the result of the interpolation. The above-mentioned value of the time is sent to block 16 where an arithmetic mean is carried out of the values relative to the several pulses that constitute the signal in order to reduce the error variance. The output of block 16 is the estimation of the TOA of the signal. In parallel, from the samples of the SSR signals, the information bits, whose sequence is made available as output, are extracted, through a procedure well known to the experts: such a decoding processing occurs in block 17 of FIG. 3. The outputs of blocks 16 and 17 with the usual indications about "status" of the Station constitute the output information indicated with D (output data of the measuring Station) in FIG. 3 (and with D1, D2 and D3 in FIG. 4, as related to the number of superimposed signals—three in the example of FIG. 4—that have been resolved, measured and decoded). This information is sent by the Station, through local network or another suitable transmission system, to the central processing Subsystem—block 3 of FIG. 1—for the successive location—through Multilateration algorithm—and identification of the mobile (either aircraft or ground vehicle). Suitable delay elements, not shown in FIG. 2 since not essential for the understanding of the operation and well-known to the experts of the field, permit to compensate for the delays introduced by the several processing elements present and to align correctly the signals and their samples. The measurement Stations in addition to receiving and processing SSR signals from the transponder present in aircraft and in ground vehicles also receive SSR signals from or more reference transponder than—blocks $1_a$ and $1_b$ of FIG. 1—whose positions are rigorously known.

These signals are processed according to the same procedure just described, and the pertaining output data from block 16 are sent to block 3, to allow it to refer TOA measurements to single temporal reference, that it is the one of a chosen Station called, in the following, Reference Station.

The availability of TOAs relative to the reference Transponder allows the System to calibrate the clock of the several measuring Stations. In block 3, in fact, the TDOA, Time Difference of Arrival, is determined, by computing the difference between the TOA of the generic Station (thereafter called Station under test) and the reference Station one. In the absence of clock errors, the TDOAs obtained through the transponder reference signals would be rigorously constant, and proportional, through the speed of the light, to the difference between the distance of the Station under test and the reference Station, measured with respect to the reference transponder. Therefore, in block 3, in order to compensate the clock error, the above-mentioned difference of TOAs is calculated and subtracted to the clock time of the Station that has to be calibrated. The procedure is executed for all the Stations, obviously excluding the reference one. Such procedure, as described up to now, performs the correction only in the time instant in which the TOA of the signal of the reference transponder is measured; in order to permit the correction in any instant, as it is clearly necessary for the operation of the System, another process is executed in block 3: the Kalman filtering. In such filtering, the above-mentioned TOA difference is set as an input to a Kalman filter that, in the preferred realization, is a double state filter: time error and frequency error, and that is realized with techniques well-known to the experts of the field (see for example the reference [8]). Such filter makes available, for every Station and at every time, the correction term for the clock of the Station.

The several procedures of Multilateration, with which it is possible to obtain the space coordinates of a transponder antenna through a set of at least four TOA measurements, and therefore to locate mobile vehicles (aircraft or ground vehicles), have been known to the experts of the field since a long time, see for example reference [4]; the non-linearity of the localization equations requires iterative procedures for the search of the optimal solutions. It is therefore important to choose algorithms able to guarantee the convergence, beyond the precision, and with an affordable computational load. In the preferred realization of the present invention, a pair of in sequence algorithms is used, inside block 3. The first algorithm, not recursive, initialises the estimation of the position and is described in the work:

[11] Y. T. Chan, K. C. Ho "A simple and efficient estimator for hyperbolic location", IEEE Transactions on Signal Processing, Vol. SP-42, N. 8, August 1994, while the second, recursive and based on the minimization of the quadratic error, improves the estimation until the required level of precision is reached and is described in the work:

[12] Don J. Torrieri "Statistical theory of passive location systems", IEEE Transactions on Aerospace and Electronic Systems, Vol. AES-20, N. 2, March 1984.

The realization and embodiment forms could be changed with respect to what described and explained here, without exiting, for this reason, from the domain of the present invention, as defined from the following claims.

The invention claimed is:

1. A system for locating and identifying cooperating mobiles carrying a transponder of a secondary surveillance radar (SSR) apt to emit an SSR signal, the system comprising:
   a plurality of measuring stations;
   one or more reference transponders, installed in known positions, for performing time synchronization of the measuring stations with respect to an assigned measuring station used as a temporal reference station, so producing a single temporal reference for the system, on the basis of a difference between a time of arrival of a signal from the transponder to the assigned measurement station and a time of arrival to the station to be synchronized; and
   a processing subsystem,
   wherein each measuring station comprises a processing section for processing an SSR signal emitted by a mobile, said SSR signal comprising a preamble including a sequence of pulses, so to obtain a measure of the time of arrival referred to a clock of said station, said processing section being configured to:
      detect an SSR signal emitted by a mobile by analysing the output of a matched filter to a preamble of said signal;
      filter said SSR signal by application of a single-pulse matched filter;
      differentiate the output of the single-pulse matched filter;
      determine the time of arrival of each pulse by determining the zero-crossing of the differentiated matched filtered signal;
      reduce error variance of the time of arrival by computing an arithmetic mean of the values relative to the several pulses that constitute the signal, and
   wherein said processing subsystem collects data related to said measured time of arrival and reconstructs position and identity of the mobiles.

2. The system according to claim 1, wherein the processing is implemented through an approximation of the cascade of the matched filter and the differentiator and, in the approximation, the impulse response of approximated filtering has a first group of consecutive coefficients equal to one (+1), a second group of consecutive coefficients equal to zero and finally a third group of consecutive coefficients equal to minus one (−1).

3. The system according to claim 1, wherein, in order to realize high precision and resolution in the measurement of the time of arrival, an interpolation between two points of the amplitude-time plane is carried out, where the amplitude is the one of the signal after the processing used for the measurement, the two points being related to the two consecutive amplitude samples having opposite signs, evidencing a zero-crossing.

4. The system according to claim 1, wherein alignment of the clock of each measuring station with respect to the one of the reference stations is executed by a filtering and prediction process through a Kalman filter.

5. The system according to claim 1, wherein, in the measuring stations, the in-phase and quadrature components (I & Q) of the received signals are obtained, thereby making possible super resolution algorithms for the discrimination of signals.

6. The system according to claim 1, wherein the measuring station includes an array antenna and a multichannel receiver, with as many channels as array elements, and the output of the channels is organized as a data matrix that is processed according to least square techniques in order to estimate the mixing matrix for the various channels by exploiting time intervals where only one signal is present.

7. The system according to claim 6, wherein the estimated mixing matrix is used to un-mix, by projections in linear vector space, the superimposed signals.

8. The system according to claim 6, wherein, when a signal is completely superimposed by an interfering one, the interfering signal is separated, by projection in linear vector space, and eliminated in order to exploit the contribution of the former signal to the estimate of the mixing matrix.

9. The system according to claim 1, wherein in the central processing subsystem the precise position of the aircraft or vehicle is calculated by processing the measurements of the times of arrival, with a single temporal reference, through a multilateration processing that includes a first non-recursive part followed by a recursive part.

* * * * *